United States Patent
Wager

(10) Patent No.: US 6,990,359 B2
(45) Date of Patent: Jan. 24, 2006

(54) METHODS AND A USER EQUIPMENT FOR IDENTIFICATION IN A COMMUNICATIONS NETWORK

(75) Inventor: Stefan Wager, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 737 days.

(21) Appl. No.: 09/955,968

(22) Filed: Sep. 20, 2001

(65) Prior Publication Data
US 2002/0037749 A1 Mar. 28, 2002

Related U.S. Application Data
(60) Provisional application No. 60/235,930, filed on Sep. 28, 2000.

(30) Foreign Application Priority Data
Sep. 21, 2000 (FI) .............................................. 20002083

(51) Int. Cl.
*H04B 1/38* (2006.01)

(52) U.S. Cl. ........................ 455/561; 455/423; 455/424; 455/425; 455/456.5; 455/456.6

(58) Field of Classification Search ................. 455/561, 455/455, 423, 424, 425, 456.5, 456.6
See application file for complete search history.

(56) References Cited

U.S. PATENT DOCUMENTS

2001/0036823 A1 * 11/2001 Van Lieshout et al. ...... 455/418

FOREIGN PATENT DOCUMENTS

| EP | 597640 A1 | * | 5/1994 |
| EP | 854581 A2 | * | 7/1998 |
| EP | 980149 A2 | * | 2/2000 |
| EP | 0993137 A1 | | 4/2000 |
| EP | 1091513 A2 | | 4/2001 |
| JP | 403076449 A | * | 4/1991 |
| WO | WO01/72057 | | 9/2001 |

OTHER PUBLICATIONS

3rd Generation Partnership Project; Technical Specification Group Services and Systems Aspects; Network Architecture (Release 1999). 3G TS 23.002 V3.3.0 (Mar. 2000).
3rd Generation Partnership Project; Technical Specification Group Services and Systems Aspects;General UMTS Architecture (Release 4). 3GPP TS 23.101 V4.0.0 (Apr. 2004).
3rd Generation Partnership Project; Technical Specification Group Services and System Aspects; UMTS Access Stratum; Services and Functions (Release 4). 3GPP TS 23.110 V4.0.0 (Apr. 2004).

* cited by examiner

Primary Examiner—Melur Ramakrishnaiah
(74) Attorney, Agent, or Firm—Potomac Patent Group PLLC

(57) ABSTRACT

The present invention relates to methods and user equipment of processing received data at a user equipment connected to a communications network. The processing comprises steps of receiving radio frames in a receiver of the user equipment, identifying the transport block sizes of the radio frame in the user equipment, and determining whether the received radio frame includes transport blocks that are not directed to the user equipment.

18 Claims, 5 Drawing Sheets

METHODS AND A USER EQUIPMENT FOR IDENTIFICATION IN A COMMUNICATIONS NETWORK

This application claims priority under 35 U.S.C. § 119 and/or 365 to 20002083 filed in Finland on Sep. 21, 2000 and 60/235,930 filed in The United States of America on Sep. 28, 2000; the entire content of which is hereby incorporated by reference.

TECHNICAL FIELD OF THE INVENTION

The present invention relates to methods and a user equipment for identification in a communications network, and more particularly, for identifying transport blocks that are not directed to the user equipment in a communications network.

BACKGROUND OF THE INVENTION

For the $3^{rd}$ generation mobile communications systems, such as UMTS (Universal Mobile Telecommunications Systems), data transfer architectures have been introduced between a core network (CN) and UTRAN (UMTS Terrestrial Radio Access Net-work), and also between UTRAN and UE (User Equipment). The architecture of the UMTS is known for the person skilled in the art, and therefore, it will be not disclosed herein in details. The possible UMTS architectures have been introduced e.g., by $3^{rd}$ Generation Partnership Project (3GPP) in a technical specification 3G TS 23.002 (Network Architecture), which is incorporated herein by reference.

The data transfer architectures are divided into two main categories, i.e., a non-access stratum and an access stratum. The non-access stratum offers higher layer (e.g., a network layer) signaling, such as Mobility Management (MM) and Call Control (CC), between network elements. The access stratum is the functional grouping consisting of the parts in the infrastructure and in the user equipment and the protocols between these parts being specific to the access technique. The access stratum provides services related to the transmission of data over the radio interface and the management of the radio interface to the other parts of UMTS. The access stratum offers services for the non-access stratum through the Service Access Point (SAPs), such as General Control (GC) SAPs, Notification (Nt) SAPs and Dedicated (DC) SAPs. The service can be defined by a set of service primitives, or operations, that a lower layer provides to upper layer or layers. The services provided by and for a user equipment are classified for five categories: tele-services (e.g., speech, emergency call, short message service, cell broadcast service), bearer services (information transfer attributes and information quality attributes), supplementary services (e.g., call forwarding, Advice of Charge, explicit call transfer), service capabilities (e.g., mobile station execution environment, location services, SIM Application Toolkit), and GSM system features (e.g., Network Identity and Time Zone, Unstructured Supplementary Service Data).

A physical layer of UTRAN (being a part of an access stratum), i.e., layer 1 in OSI Reference Model (which is well known to a person skilled in the art), is based on WCDMA (Wideband Code Division Multiple Access). The physical layer interfaces a Medium Access Control (MAC)-layer, which is a sub-layer of layer 2 (i.e., data link layer), and offers different transport channels to MAC. The transport channel is characterized by how (not what kind of data) the information is transferred over a Radio Interface. The characteristics of a transport channel are defined by its transport format, specifying the physical layer processing to be applied to the transport channel in question, such as convolutional channel coding and interleaving, and any service specific rate matching as needed. There are two duplex modes (e.g., for UTRA (UMTS Terrestrial Radio Access)), i.e., FDD (Frequency Division Duplex) and TDD (Time Division Duplex).

FDD is a duplex method whereby uplink and downlink transmissions use two separated radio frequencies. In FDD, each uplink and downlink uses the different frequency band. The present invention relates to the FDD mode for transmission of data.

TDD is a duplex method whereby uplink and downlink transmissions are carried over the same radio frequency by using synchronized time intervals. In the TDD, time slots in a physical channel are divided into transmission and reception part, and information on uplink and downlink are transmitted reciprocally.

The physical layer operates exactly according to the layer 1 radio frame timing. A transport block is defined as the data accepted by the physical layer to be jointly encoded. A transport block is a basic unit exchanged between layer 1 and MAC, for layer 1 processing, and a transport block size is the number of bits in a transport block. The transport block size is always fixed within a given transport block set (which is a set of transport blocks), i.e., all transport blocks within a transport block set are equally sized.

A UE can set up multiple transport channels simultaneously, each one of them having its own characteristics, and each transport channel can be used for information stream transfer of one radio bearer from or for layer 2 (i.e., data link layer) and higher layer signaling messages.

The transport channels (uplink and downlink channels) can be divided into two main categories dedicated transport channels (e.g., a dedicated channel, DCH) and common transport channels (e.g., Random Access Channel, RACH). The dedicated transport channels are dedicated to one UE, and therefore, the inband identification of UE is not needed. Common transport channels are shared by several users, and inband identification of UE is needed. The identification of a UE is achieved by a Radio Network Temporary Identity (RNTI) field of MAC-layer. The multiplexing of the transport channels onto the same or different physical channels is carried out by layer 1.

The channel coding and multiplexing generally comprise the following steps (not necessarily in this order):

CRC (Cyclic Redundancy Code) attachment is added to a transport block.

Inserting a tail bit attachment to the 'transport block+CRC'.

Convolutional coding (or alternatively turbo coding or alternatively no coding) of 'transport block+CRC+tail bit attachment'.

Rate matching.

$1^{st}$ interleaving.

Radio frame segmentation.

(Possible) $2^{nd}$ interleaving.

Transmitting radio frames through the physical channel to the receiving party (i.e., UE or Access Network or Core Network).

The present day decoding and demultiplexing methods are based on the technical specifications of 3GPP. The following steps apply to common channel processing. After receiving the radio frame in a receiver (e.g., a RAKE-receiver of a UE), the radio frame is processed by the UE. The processing includes deinterleaving, rate matching, turbo decoding (or alternatively convolutional decoding or alternatively no decoding), calculating a CRC checksum. Then the result of the previous processes will be transferred to the MAC, which identifies (if needed) the UE by identifying a Radio Network Temporary Identity (RNTI) transmitted in a radio frame. In other words, a UE decodes all packets on all transport channels multiplexed on one physical channel up to a MAC level, where the UE, based on the RNTI, determines whether the message is destined for it, or whether it is destined to another UE and should be discarded. Thereafter, the MAC layer transfers the received data for higher layers.

The above method may, however, prove inefficient as the bandwidth of the physical channel may be considerably higher than the service the UE has ordered. Furthermore, the UE needs to carry out several processes before identifying whether the radio frame is destined to the UE or to some other UE(s). Carrying out several processes consumes valuable power (e.g., battery) of the UE.

SUMMARY OF THE PRESENT INVENTION

As the user equipment has only a limited amount of power (e.g., the battery of a mobile phone), it is preferable to minimize the required processes implemented by the user equipment. Therefore, it is desirable to identify as early as possible whether the received radio frame includes transport blocks that are not destined for the user equipment in question, and therefore needs not to be decoded and further processed, or may the received transport blocks of the radio frame be destined for said user equipment.

It is an object of the present invention to minimize the disadvantages occurring by processing the transport blocks all the way up to the MAC-layer, and to identify the predefined destination (i.e., whether the transport blocks of the radio frame may be destined to the user equipment in question or is destined to some other user equipment) of the transport blocks at an earlier stage.

According to a first aspect of the present invention there is provided a method of processing received data at a user equipment (UE) connected to a communications network, the method comprising:

receiving radio frames in a receiver of the user equipment;

identifying a Transport Format Combination Indicator (TFCI) of the radio frame in the user equipment; and determining whether the received radio frame includes transport blocks that are not directed to the user equipment.

According to the first aspect of the present invention, the determining preferably comprises:

identifying which transport channels include transport blocks in the received radio frame;

determining which of these transport channels carry transport blocks that are not directed to the user equipment; and determining that these transport channels are not directed to the user equipment.

According to a second aspect of the present invention there is provided a method of processing received data at a user equipment (UE) connected to a communications network, the method comprising:

receiving radio frames in a receiver of the user equipment;

identifying transport block sizes of the radio frame in the user equipment; and determining whether the received radio frame includes transport blocks that are not directed to the user equipment.

According to the second aspect of the present invention, the determining preferably comprises:

comparing the received transport block sizes to the transport block sizes used by the radio access bearer services of the user equipment;

determining which received transport blocks are not of the sizes used by the radio access bearer services of the user equipment; and determining that these transport blocks are not directed to the user equipment.

Preferably, in case the received radio frame includes transport blocks that are not directed to the user equipment, the user equipment not further processing the transport blocks that are not directed to the user equipment.

Preferably, in case the received transport blocks may be directed to the user equipment, the user equipment further processing the received transport blocks. More preferably the transport blocks processing comprises one or multiple of the following processes: deinterleaving, rate matching, error control decoding, calculating a cyclic redundancy code (CRC) checksum, processing the data in a medium access control (MAC)-layer.

Preferably, the receiver is a RAKE-receiver and the user equipment is a mobile station.

The method achieves an earlier recognition of the destination of the transport blocks (i.e., recognizing if the transport blocks are not directed to the user equipment), which provides fewer functions to be processed by the UE, because the UE can earlier determine whether the transport blocks may be destined to the UE, in which case they will be further processed, or to some other UE. This will also lead to power savings, because the transport blocks that are not destined to the UE(s) need not be processed any further, and thus they can be discarded at an earlier stage.

According to a third aspect of the present invention there is provided a user equipment comprising:

means for receiving radio frames;

means for identifying a Transport Format Combination Indicator (TFCI) of the radio frame; and means for determining whether the received radio frame includes transport blocks that are not directed to the user equipment.

According to a fourth aspect of the present invention there is provided a user equipment comprising:

means for receiving radio frames;

means for identifying transport block sizes of the radio frame in the user equipment; and means for determining whether the received radio frame includes transport blocks that are not directed to the user equipment.

Preferably, the user equipment further comprises processing means for further processing the transport blocks. More preferably, the processing means is capable of processing at least one of the following processes: deinterleaving, error control decoding, calculating cyclic redundancy code (CRC) checksum, processing a data in a medium access control (MAC)-layer.

Preferably, the means for receiving radio frames is a RAKE-receiver.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
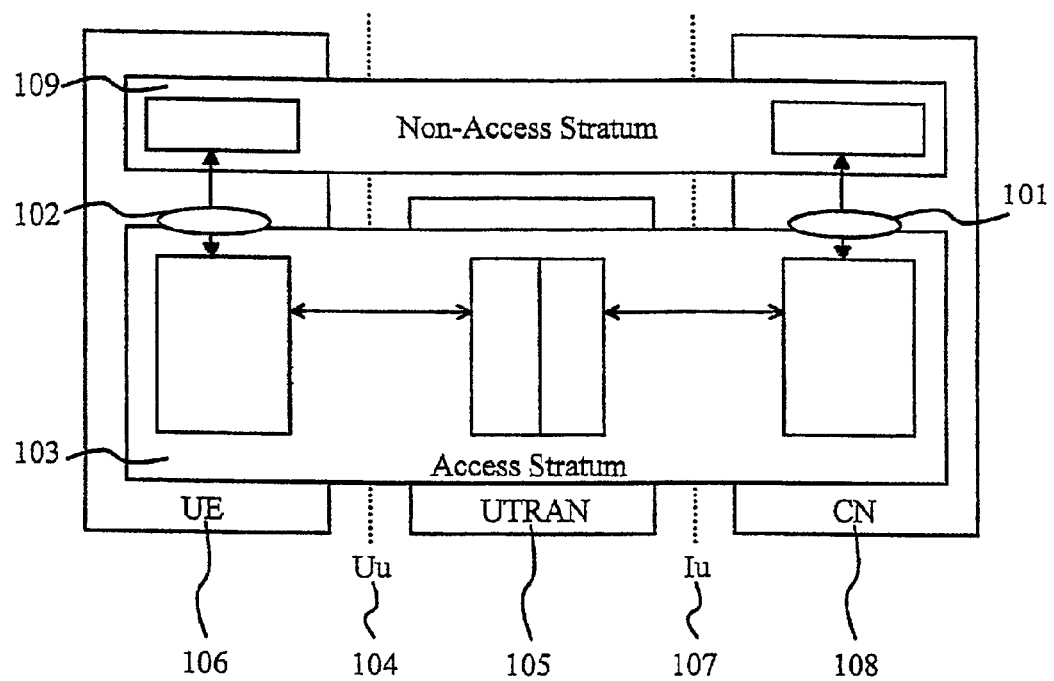
FIG. 1 shows schematically a user plane in a UMTS, in which the present invention can be implemented.

FIG. 1 shows a user plane in a UMTS, wherein the radio access bearer service is offered from SAP 101 to SAP 102 (or in the opposite direction) by the Access Stratum 103. The protocols on the Radio Interface 104, between a UTRAN 105 and a UE 106, and the interconnection point 107, between the UTRAN 105 and a Core Network 108 (CN), that are linked together to provide the Radio Access Bearer (RAB) service. The system of FIG. 1 can be used as a base for implementing the present invention. The present invention considers the data transfer from the UTRAN 105 to the User Equipment 106. FIG. 1 further shows a Non-Access Stratum 109 that offers higher layer signaling, which is not under consideration of the present invention.

Figure 2:
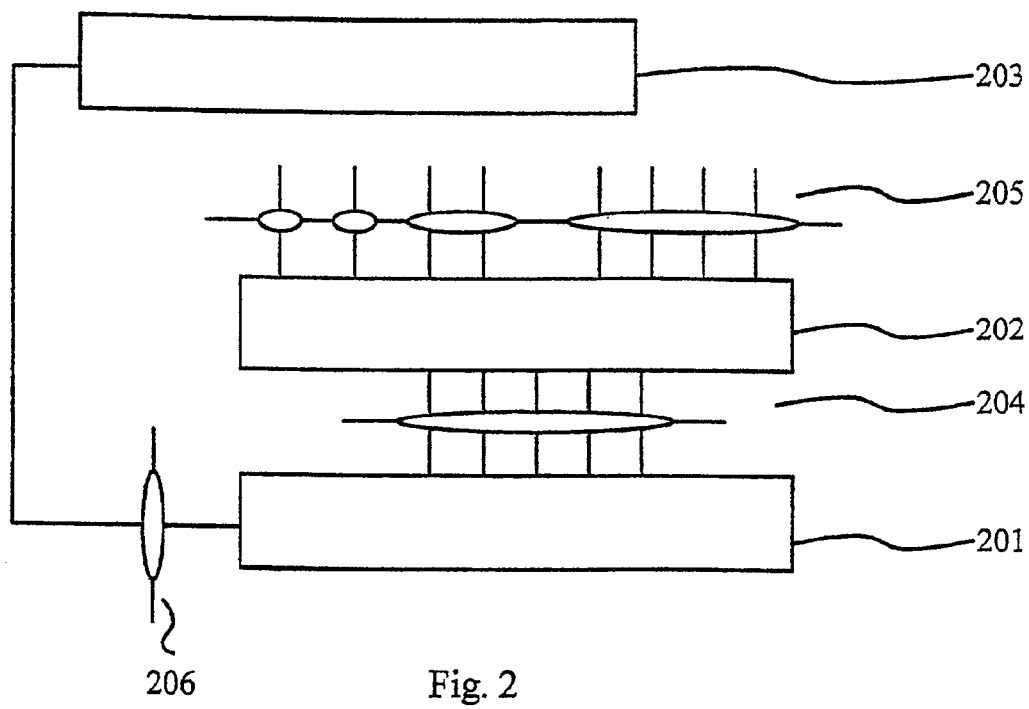
FIG. 2 shows schematically a Radio Interface protocol architecture.

FIG. 2 shows a Radio Interface protocol architecture around a physical layer 201 (Layer 1). The physical layer 201 interfaces a Medium Access Control (MAC)-layer 202, which is a sub-layer of Layer 2, and the Radio Resource Control (RRC)-layer 203 of Layer 3. The physical layer 201 offers different transport channels 204 to MAC 202. MAC 202, in turn, offers logical channels 205 to the Radio Link Controller (not shown in FIG. 2), which is a sub-layer of layer 2. The physical layer 201 and RRC are connected via SAP 206, which offers control/measurement transportation between the physical layer and Radio Resource Control layer.

The transport channels, which are the main consideration in the present invention, can be dedicated transport channels or common transport channels. Because, the dedicated transport channels do not require an inband identification of the UE (the dedicated channels transport information to a specific UE), they will not be considered in detail in this presentation. The consideration of this presentation is directed to common transport channels that are shared by several UEs, and especially to FACH (Forward Access Channel). FACH is a downlink common transport channel, which is transmitted over the entire cell or over only a part of the cell using e.g., beam-forming antennas. FACH can be transmitted using slow power control.

Figure 3:
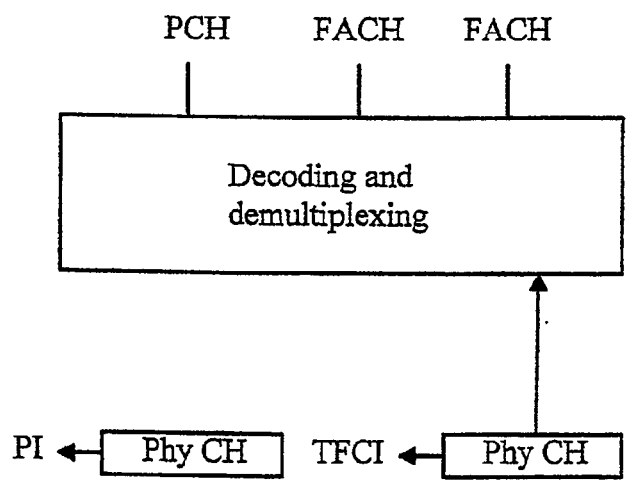
FIG. 3 shows schematically model of the UE's physical layer for a downlink according to one embodiment of the present invention.

FIG. 3 shows a model of the UE's physical layer for a downlink, in which a PCH (Paging Channel) and two FACHs have been encoded and multiplexed on together forming a CCTrCH (Coded Composite Transport Channel), in FDD mode. CCTrCH, as defined by 3GPP, is a data stream resulting from encoding and multiplexing of one or several transport channels. Multiple CCTrCH can be used simultaneously with one UE, in which case one or several TFCI can be used, but each CCTrCH has only one corresponding TFCI for indication of the transport formats used on each PCH and FACH. The PCH is associated with a separate physical channel carrying PIs (page indicators), which are used to trigger UE reception of the physical channel that carries PCH. Even though, in FIG. 3 there is one PCH and two FACHs encoded and multiplexed on together forming a CCTrCH, a FACH or a PCH can also be individually mapped onto a separate physical channel.

After a data stream of the CCTrCH is received from the physical channel, the data stream of the CCTrCH is fed to a data decoding and demultiplexing unit that decodes and demultiplexes the CCTrCH's data stream onto transport channels (i.e. one PCH and two FACHs in FIG. 3). Even though, there is shown one PCH and two FACHs in FIG. 3, the skilled person in the art appreciates that three transport channels is just an example used to illustrate layer 1 demultiplexing and alternative channel combinations may be applied to the present invention. There may be e.g., three FACHs and no PCH. In the simplest form there is only one FACH in question.

Figure 4:
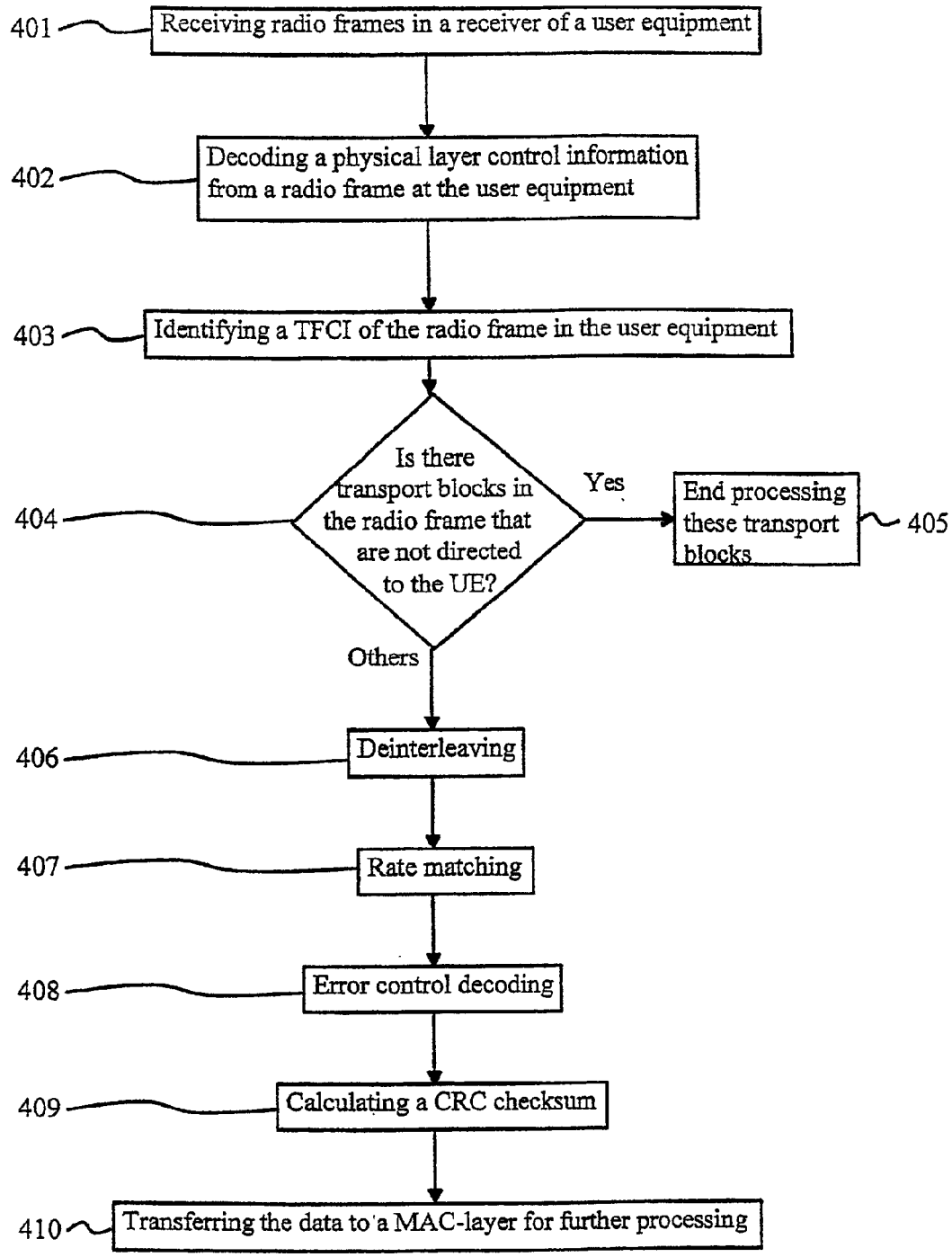
FIG. 4 is a flowchart illustrating the method of the preferred embodiment of the present invention.

Referring now to FIG. 4, which illustrates the inventive concept of the present invention. After receiving the data in a physical entity of UE (e.g., by a RAKE-receiver) (step 401), the physical layer control information is decoded from the radio frame (step 402). On step 403, the user equipment identifies a TFCI (Transport Format Combination Indicator). Thereafter, on step 404, the UE determines whether the received transport blocks of the radio frame are not directed to the user equipment (or may be directed to the user equipment). If the transport blocks of the radio frame may not be directed to the UE but to some other UE (not shown in the figure), the UE ends processing of these transport blocks (step 405). In case the received transport blocks of the radio frame may be directed to the UE, the UE further processes the transport blocks as following. The UE does deinterleaving (step 406), the rate matching (step 407), error control decoding (e.g., Viterbi or turbo) (step 408), calculates the CRC checksum (step 409), and transfers the received transport blocks to a MAC-layer for further processing (step 410).

The present invention covers two embodiments to determine (in step 404 in FIG. 4) whether the radio frames are not directed to the user equipment or may be directed to the user equipment.

The preferred embodiment of the present invention can be implemented when several FACHs are multiplexed onto the same physical channel. Since a transport channel can only support a constant transmission quality (e.g., block error rate) target, and a limited set of transport block sizes several FACHs are needed to support Radio Access Bearers (RABs) with different requirements on transmission quality. At RAB establishment, a network informs the user equipment on which FACH the information will be transmitted. Upon receiving a CCTrCH frame, the user equipment can by reading the TFCI determine which are FACHs that include data in this frame. If no data is received on the FACH, onto which the RAB(s), which the user equipment has established, is present in the CCTrCH frame, the user equipment can stop processing this frame.

As for illustrating the preferred embodiment of the present invention, let's consider the following simplified situation. A UMTS Terrestrial Radio Access Network (UTRAN) is configured to support two basic services: Radio Access Bearer 1 (RAB1) for best effort WWW IP traffic and Radio Access Bearer 2 (RAB2) for Highway traffic information service. Because of the different quality requirements of the services, they are mapped onto different FACHs. Both FACHs are mapped onto the same Downlink Physical Data Channel (DPDCH) on layer 1. However, the bandwidth allocated on FACH for RAB1 is much larger than for RAB2, because of the traffic characteristics and requirements. A UE not implementing the present invention would have to decode all information on the DPDCH up to MAC level to read the RNTI and determine whether the information was addressed to it or not. A UE implementing the present invention can already after reading the TFCI cease to process the information on transport channels carrying the services it does not use. E.g., for UEs only using RAB2, this is a considerable gain, since the FACH carrying RAB1 has a higher bit rate, and therefore, it requires more processing to decode.

Figure 5:
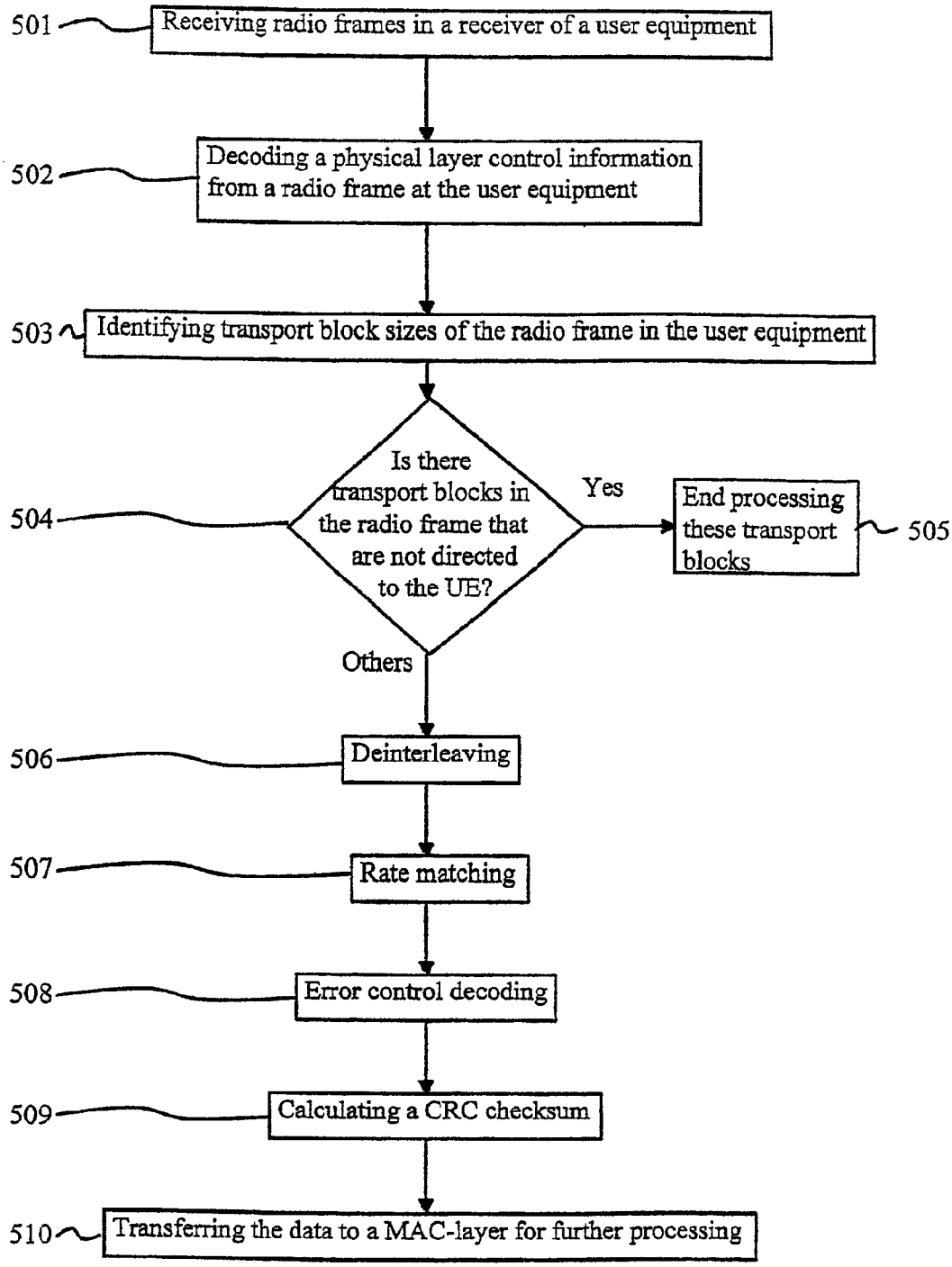
FIG. 5 is a flowchart illustrating the method of another embodiment of the present invention.

Referring now to FIG. 5, which illustrates another embodiment of the inventive concept of the present invention. After receiving the data in a physical entity of UE (e.g., by a RAKE-receiver) (step 501), the physical layer control information is decoded from the radio frame (step 502). On step 503, the user equipment identifies the transport block sizes of the radio frame in the user equipment. Thereafter, on step 504, the UE determines whether the received transport blocks are of the size that the transport blocks may be directed to the user equipment (or may be directed to some other user equipment). If the transport blocks were not of the size that may be directed to the UE, the UE ends processing of the transport blocks (step 505). In case at least one of the received transport blocks are of the size that may be directed to the UE, the UE further processes the radio frame as following. The UE does deinterleaving (step 506), the rate matching (step 507), error control decoding (e.g., turbo or Viterbi) (step 508), calculates the CRC checksum (step 509), and transfers the received transport blocks to a MAC-layer for further processing (step 510). It should be noted that only the transport blocks of the size that may be directed to the UE need to be processed beyond step 506.

Another embodiment of the present invention also uses the block size to determine whether the CCTrCH frame needs further processing or not (i.e., are the transport blocks not directed to the user equipment). As disclosed in the preferred embodiment of the present invention, one FACH can only support a limited set of block sizes. At RAB establishment, the user equipment is informed of the transport block (TB) sizes used for each RAB. By using this information, the user equipment can quit processing transport blocks that are of other sizes, since they belong to services the user equipment has not subscribed to.

Even though the present invention discloses a preferred embodiment and another embodiment, both embodiments may be used simultaneously.

Figure 6:
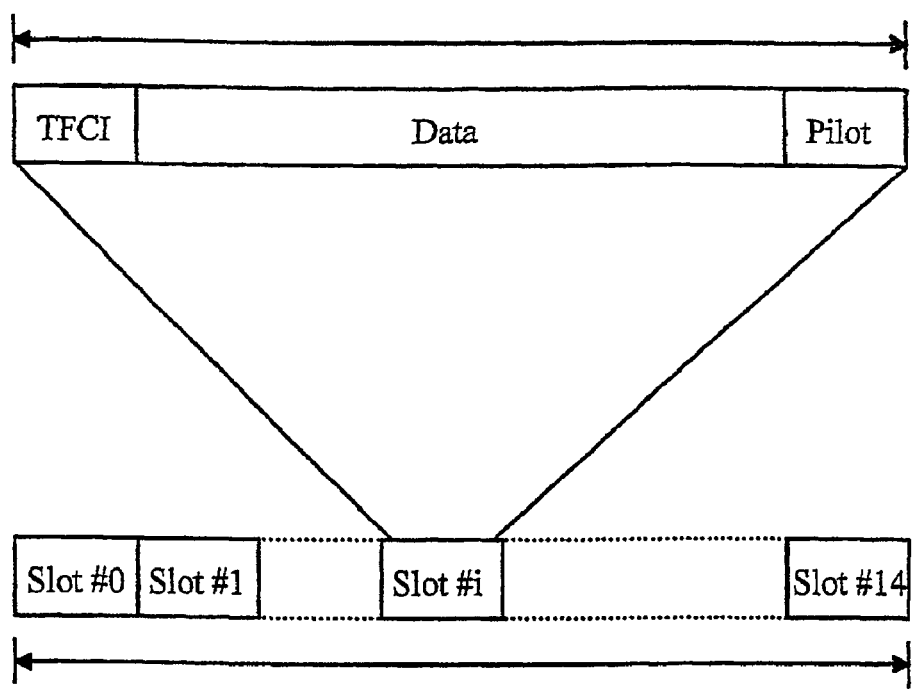
FIG. 6 shows a possible frame structure for a common control physical channel that is used to carry FACH and/or PCH.

FIG. 6 shows a possible frame structure for a common control physical channel that is used to carry FACH and/or PCH. A frame includes multiple slots, which in turn, comprise a Transport Format Combination Indicator (TFCI) field, a data field and a pilot field.

The Transport Format Combination Indicator is a presentation of the current Transport Format Combination (TFC), which is a combination of the currently valid Transport Formats that can be submitted simultaneously to the layer 1 for transmission on a Coded Composite Transport Channel of a user equipment. TFCI is used to inform the user equipment of the currently valid Transport Format Combination and hence how to decode, demultiplex and deliver the received data on the appropriate transport channels.

The data field contains data bits that are transported to the user equipment.

The pilot field includes the pilot symbols used for channel estimation.

It will be appreciated by the skilled person that various modifications may be made to the above described embodiments without departing from the scope of the present invention. For example, there may be several FACHs and no PCH encoded and multiplexed on together forming a CCTrCH.

What is claimed is:

1. A method of processing received data at a user equipment connected to a communications network, the method comprising:
   receiving radio frames in a receiver of the user equipment;
   identifying transport block sizes of the radio frame in the user equipment; and
   determining whether the received radio frame includes transport blocks that are not directed to the user equipment;
   wherein the determining comprises:
   comparing the received transport block sizes to the transport block sizes used by the radio access bearer services of the user equipment;
   determining which received transport blocks are not of the sizes used by the radio access bearer services of the user equipment; and
   determining that these transport blocks are not directed to the user equipment.

2. A method according to claim 1, wherein the method further comprises, in case the received transport blocks may be directed to the user equipment, the user equipment further processing the received transport blocks.

3. A method according to claim 2, wherein the transport blocks processing comprises deinterleaving.

4. A method according to claim 2, wherein the transport blocks processing comprises rate matching.

5. A method according to claim 2, wherein the transport blocks processing comprises error control decoding.

6. A method according to claim 2, wherein the transport blocks processing comprises calculating a cyclic redundancy code checksum.

7. A method according to claim 2, wherein the transport blocks processing comprises processing the data in a medium access control layer.

8. A method according to claim 1, wherein the method further comprises, in case the received radio frame includes transport blocks that are not directed to the user equipment, the user equipment not further processing the transport blocks that are not directed to the user equipment.

9. A method according to claim 1, wherein the receiver is a RAKE-receiver.

10. A method according to claim 1, wherein the user equipment is a mobile station.

11. A user equipment comprising:
    means for receiving radio frames;
    means for identifying transport block sizes of the radio frame in the user equipment; and
    means for determining whether the received radio frame includes transport blocks that are not directed to the user equipment by comparing the received transport block sizes to the transport block sizes used by the radio access bearer sevices of the user equipment, determining which received transport blocks are not of the sizes used by the radio access bearer services of the user equipment, and determining that these transport blocks are not directed to the user equipment.

12. A user equipment according to claim 11, wherein the user equipment further comprises processing means for further processing the transport blocks.

13. A user equipment according to claim 12, wherein the processing means is capable of processing at least one of the following processes: deinterleaving, error control decoding, calculating cyclic redundancy code checksum, processing a data in a medium access control layer.

14. A user equipment according to claim 11, wherein the means for receiving radio frames is a RAKE-receiver.

15. A user equipment, comprising:
   a radio frame receiver; and
   a processor configured to identify transport block sizes of received radio frames, and to determine whether received radio frames include transport blocks that are not directed to the user equipment, wherein the processor is configured to compare transport block sizes of received radio frames to transport block sizes used by a radio access bearer services of the user equipment, determine which received transport blocks are not of the sizes used by the radio access bearer services of the user equipment, and determine that these transport blocks are not directed to the user equipment.

16. The user equipment of claim 15, wherein the radio frame receiver is a RAKE-receiver.

17. The user equipment of claim 15, wherein the processor is configured to further process the transport blocks.

18. The user equipment of claim 17, wherein the further processing is at least one of deinterleaving, error control decoding, calculating cyclic redundancy code checksum, and processing a data in a medium access control layer.

* * * * *